United States Patent
Cheru et al.

(10) Patent No.: US 11,093,465 B2
(45) Date of Patent: *Aug. 17, 2021

(54) OBJECT STORAGE SYSTEM WITH VERSIONED META OBJECTS

(71) Applicant: Western Digital Technologies, Inc., San Jose, CA (US)

(72) Inventors: Tomy Ammuthan Cheru, Thrissur (IN); Carl D'Halluin, Ghent (BE); Ameet Pyati, Bengaluru (IN)

(73) Assignee: Western Digital Technologies, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/447,366

(22) Filed: Jun. 20, 2019

(65) Prior Publication Data

US 2020/0401567 A1    Dec. 24, 2020

(51) Int. Cl.
*G06F 12/00* (2006.01)
*G06F 16/21* (2019.01)
*G06F 16/27* (2019.01)

(52) U.S. Cl.
CPC ............ *G06F 16/219* (2019.01); *G06F 16/27* (2019.01)

(58) Field of Classification Search
CPC ...... G06F 3/065; G06F 3/0629; G06F 3/0604; G06F 3/0644
See application file for complete search history.

(56) References Cited

U.S. PATENT DOCUMENTS

| | | | |
|---|---|---|---|
| 5,347,653 A * | 9/1994 | Flynn | G06F 16/219 707/695 |
| 7,778,972 B1 * | 8/2010 | Cormie | G06F 3/067 707/626 |
| 8,484,259 B1 | 7/2013 | Makkar et al. | |
| 9,043,567 B1 | 5/2015 | Modukuri et al. | |
| 9,047,312 B1 * | 6/2015 | Ten-Pow | G06F 16/174 |
| 10,216,581 B2 | 2/2019 | Factor et al. | |
| 10,372,555 B1 * | 8/2019 | Troyan | G06F 16/27 |
| 2007/0185921 A1 | 8/2007 | Prahlad et al. | |
| 2011/0196873 A1 * | 8/2011 | Kesselman | G06F 16/27 707/741 |
| 2012/0166487 A1 * | 6/2012 | Stougie | G06F 11/1076 707/792 |
| 2013/0024424 A1 | 1/2013 | Prahlad et al. | |
| 2014/0310492 A1 | 10/2014 | Motwani et al. | |

(Continued)

FOREIGN PATENT DOCUMENTS

EP          3101545 B1    12/2018

OTHER PUBLICATIONS

International Search Report and Written Opinion of Application No. PCT/US2020/019769, dated Jul. 23, 2020 (10 pages).

*Primary Examiner* — Arvind Talukdar
(74) *Attorney, Agent, or Firm* — Patent Law Works LLP

(57) ABSTRACT

Example object storage systems, meta object generators, and methods provide versioned meta objects for internal operational data that may be replicated between data object stores. A meta object may be generated that includes meta object data, such as internal operational data. A meta object identifier may be assigned to the meta object. A first version identifier may be associated with the meta object data and a second version identifier may be associated with a marker for the meta object, where the marker prevents exposure as a user data object.

20 Claims, 13 Drawing Sheets

(56) References Cited

U.S. PATENT DOCUMENTS

| | | |
|---|---|---|
| 2015/0186437 A1 | 7/2015 | Molaro |
| 2018/0060178 A1 | 3/2018 | Barajas Gonzalez et al. |
| 2018/0150499 A1 | 5/2018 | Lee et al. |
| 2018/0203865 A1 | 7/2018 | Srinivasan et al. |
| 2019/0121705 A1 | 4/2019 | Mayo et al. |

* cited by examiner

OBJECT STORAGE SYSTEM WITH VERSIONED META OBJECTS

TECHNICAL FIELD

The present disclosure generally relates to data storage, and in a more particular example, to storing and replicating operational objects.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may support replication, such as asynchronous replication, between object data stores for fault tolerance, performance, and/or disaster recovery. In some systems, replication may be configured at the bucket level and allow users to configure replication at bucket granularity. For example, all data objects in a bucket configured for replication may be replicated to a remote bucket. Similarly, disaster recovery and similar features may enable the replicated data objects to be recovered to the failed system or a new replacement system.

In some systems, data buckets may have associated configuration or similar operational data that is not stored in user data objects and their related metadata. For example, bucket configuration metadata may include replication configuration parameters, user access control lists, object life cycle policy, and other features configurable at the bucket level. This associated configuration information may not be replicated with the user data objects. As a result, recovery from the replicated object store may enable the user data objects to be recovered, but require manual reconstruction of associated configuration data. In some deployments, there may be millions of buckets or other logical configuration groups that need to be reconfigured for disaster recovery, which could be a very tedious task to do manually.

As large-scale storage systems scale, reliable and efficient implementations for managing replication of object data stores for automated recovery may be needed. A need exists for at least object storage systems that reliably replicate configuration data and/or provide for automated recovery thereof.

SUMMARY

Various aspects for meta object replication between object storage systems, particularly, replication and recovery of meta objects containing configuration data with user data objects are described.

One general aspect includes a system that includes a first object data store configured to store a plurality of data objects and a meta object generator configured to generate a meta object and store the meta object in the first object data store. The meta object includes: meta object data; a meta object identifier assigned to the meta object; a first version identifier associated with a first version of the meta object data; and a second version identifier associated with a marker for the meta object, where the marker prevents exposure as a user data object.

Implementations may include one or more of the following features. The system may also include a metadata store associated with the first object data store and configured to store configuration data for the first object data store, where the meta object generator is further configured to select the meta object data from the configuration data. The first object data store may be further configured to store the plurality of data objects in a data object bucket. The meta object data may include bucket configuration data. The meta object and user data objects may be stored in the data object bucket. The system may also include a replication manager configured to replicate the meta object and user data objects from the first object data store to a second object data store. The meta object generator may be further configured to use a version control function to determine the first version identifier and the second version identifier. The version control function for the second version identifier may be configured to increase a timestamp value for the marker to determine the second version identifier. The marker may be a delete marker. The meta object generator may be further configured to: receive a configuration change for updated configuration data for the first object data store; generate an updated meta object; and store the updated meta object in the first object data store. The updated meta object may include: updated meta object data based on the updated configuration data; the meta object identifier assigned to the meta object; a third version identifier associated with the updated meta object data; and a fourth version identifier associated with an updated marker for the meta object, where the updated marker prevents exposure as a user data object. The system may also include a storage interface configured to receive a user data request including the meta object identifier and return, responsive to the marker, an error message.

Another general aspect includes a computer-implemented method that includes: selecting meta object data for a meta object; assigning a meta object identifier to the meta object; assigning a first version identifier associated with a first version of the meta object data; assigning a second version identifier associated with a marker for the meta object, where the marker prevents exposure as a user data object; storing the meta object in a first object data store including a plurality of data objects.

Implementations may include one or more of the following features. The computer-implemented method may also include storing configuration data in a metadata store associated with the first object data store, where selecting the meta object data includes selecting the meta object data from the configuration data. The computer-implemented method may further include configuring the first object data store to store the plurality of data objects in a data object bucket, where the meta object data is bucket configuration data and the meta object and user data objects are stored in the data object bucket. The computer-implemented method may also include replicating the meta object and the user data objects from the first object data store to a second object data store. Assigning the first version identifier may use a version control function and assigning the second version identifier uses the version control function. Assigning the second version identifier may include increasing a timestamp value for the marker to determine the second version identifier. The marker may be a delete marker. The computer-implemented method may further include receiving a configuration change for updated configuration data for the first object data store, generating an updated meta object, and storing the updated meta object in the first object data store. The updated meta object may include: updated meta object data based on the updated configuration data; the meta object identifier assigned to the meta object; a third version identifier associated with the updated meta object data; and a fourth version identifier associated with an updated marker for the meta object, where the marker prevents exposure as a user data object. The computer-implemented method may also include receiving a user data request including the meta object identifier, and returning, responsive to the marker, an error message.

Another general aspect includes a system that includes: a first object data store including a plurality of user data objects; means for selecting meta object data for a meta object; means for assigning a meta object identifier to the meta object; means for assigning a first version identifier associated with a first version of the meta object data; means for assigning a second version identifier associated with a marker for the meta object, where the marker prevents exposure as a user data, and means for storing the meta object in the first object data store.

Implementations may include one or more of the following features. Means may be provided for receiving a configuration change for updated configuration data for the first object data store. Means may be provided for generating an updated meta object, where the updated meta object includes: updated meta object data based on the updated configuration data; the meta object identifier assigned to the meta object; a third version identifier associated with the updated meta object data; and a fourth version identifier associated with an updated marker for the meta object, where the marker prevents exposure as a user data object. Means may be provided for storing the updated meta object in the first object data store.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the replication and recovery of configuration and/or operational data using meta objects replicated alongside user data objects. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Object storage systems have a notion of data objects. Data objects may be contained in buckets and each bucket may be associated with a specific object storage system or object data store. Specific object storage systems may include a number of configuration parameters, including support for versioning. In some systems, individual buckets may include different configuration parameters, including enabling and disabling version control within an object storage system that is otherwise configured for versioning.

In many object storage systems, a data object is written using either a PUT function, for single part objects, or a multi-part write process, such as INIT, multiple PARTPUT, and COMPLETE functions. Data objects written to a versioning not enabled or versioning suspended system or bucket, may create a data object with a version value set to null and a creation timestamp. Subsequent read functions, such as GET, of the data object with a defined object name (ex. "object1") may return the data object ("object1"). If an object is later written with the same object name ("object1"), the original object may be overwritten. Subsequent GET operations with the object name ("object1") may return the overwritten object and the original object may be lost.

However, in a versioning enabled system or bucket, earlier versions of the object may not get overwritten. A new write of an existing data object ("object1") may create a new version of that object. The object name does not change, but an additional version identifier may be associated with the new write. For example, when the object is initially written, it may receive a version identifier (ex. "1111"). Subsequent GET operations for the object name ("object1") return the object ("object1") with the most recent version identifier ("1111"). Each subsequent time an object with the same object name is written with versioning enabled, a new object is created with the same object name ("object1") but a new creation timestamp and a new version identifier (e.g. "2222", "3333", etc.). The set of data objects with the same object name and different version identifiers in a given storage system or bucket may be referred to collectively as a versioned data object, comprised of a plurality of data object versions. Ordering of versions may be important for GET operations that do not specify a version and are intended to retrieve the latest version of the object.

Adding a delete marker to a versioned data object similarly does not overwrite or change the earlier versions, but it may render those versions inaccessible to normal user GET operations. For example, a GET operation specifying the object name may return an error, such as "no object found". However, other operations, such as a list versions command, may return all version identifiers, including those belonging to delete markers and a GET operation that specifies a version number may still return the specified version despite the presence of a delete marker.

Figure 1:
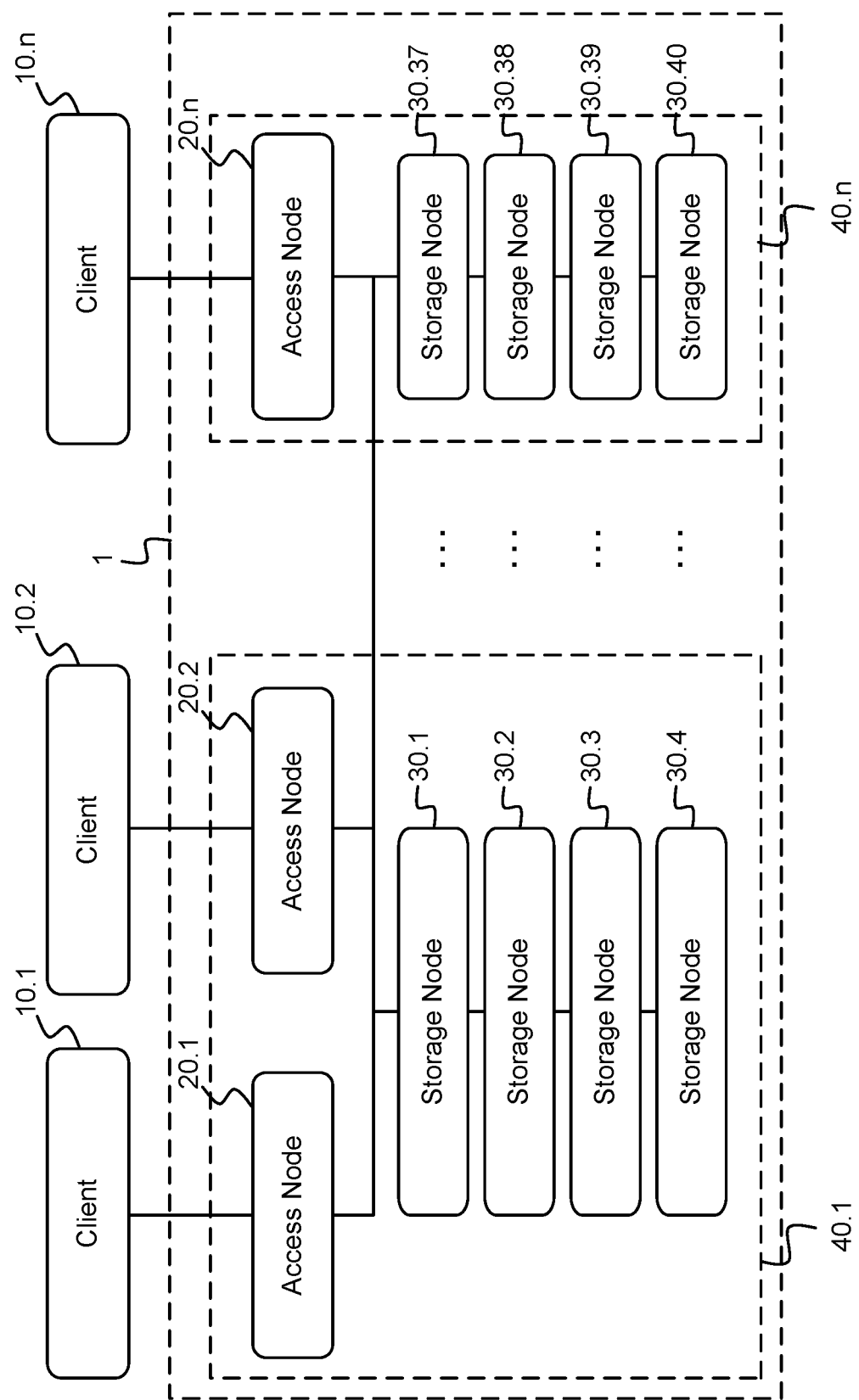
FIG. 1 schematically illustrates an example of a distributed storage system.

FIG. 1 shows an embodiment of an example distributed storage system 1. In some embodiments, the distributed storage system 1 may be implemented as a distributed object storage system which is coupled to one or more clients 10.1-10.n for accessing data objects through one or more access nodes 20.1-10.n. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks. Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft .Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
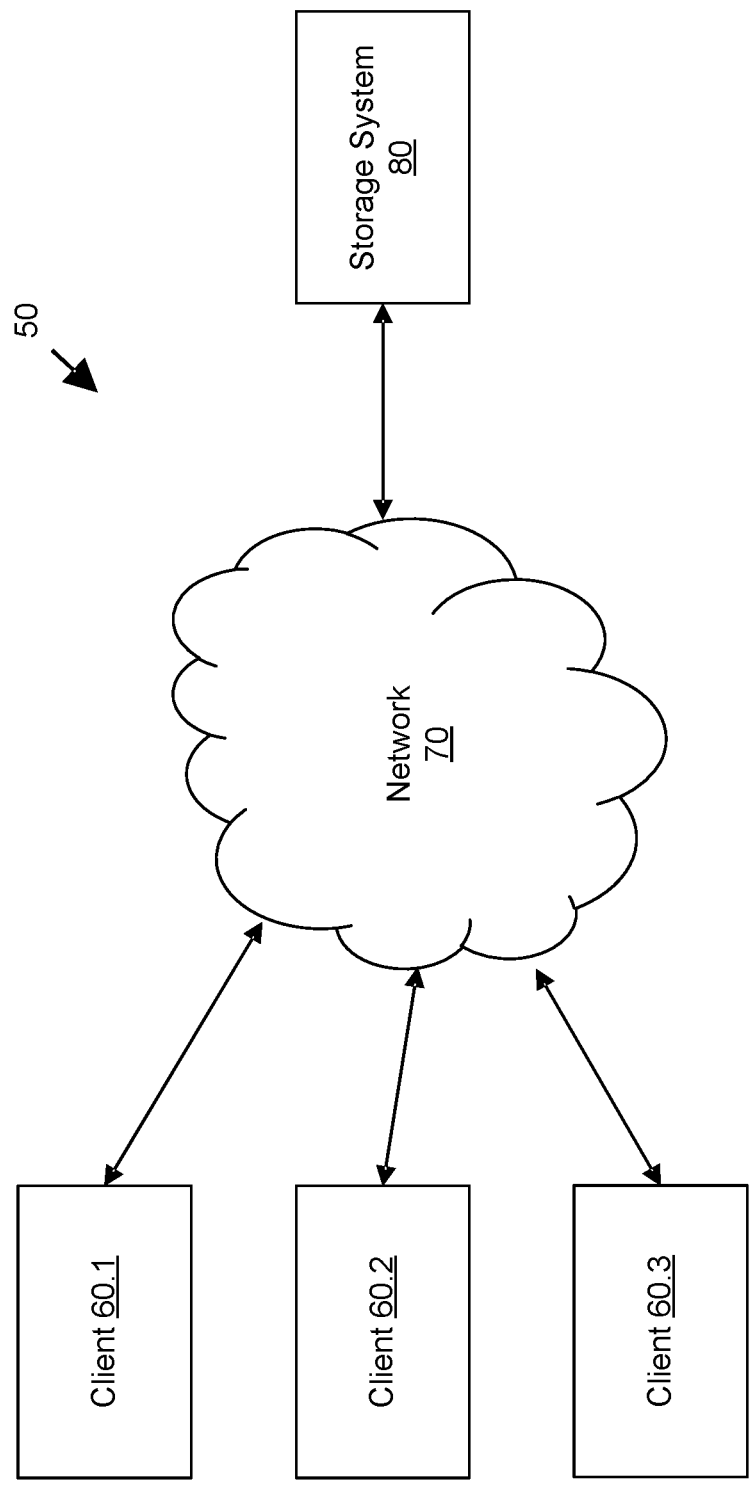
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
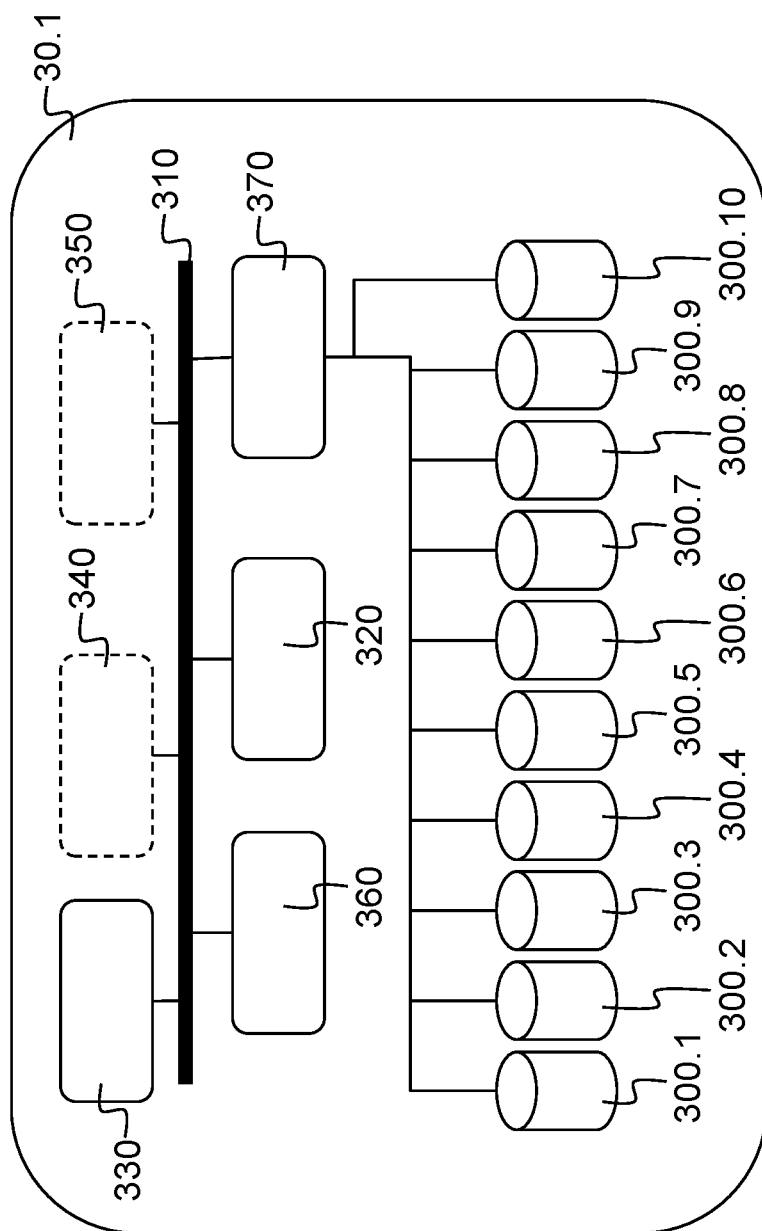
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 gigabit (Gb) Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
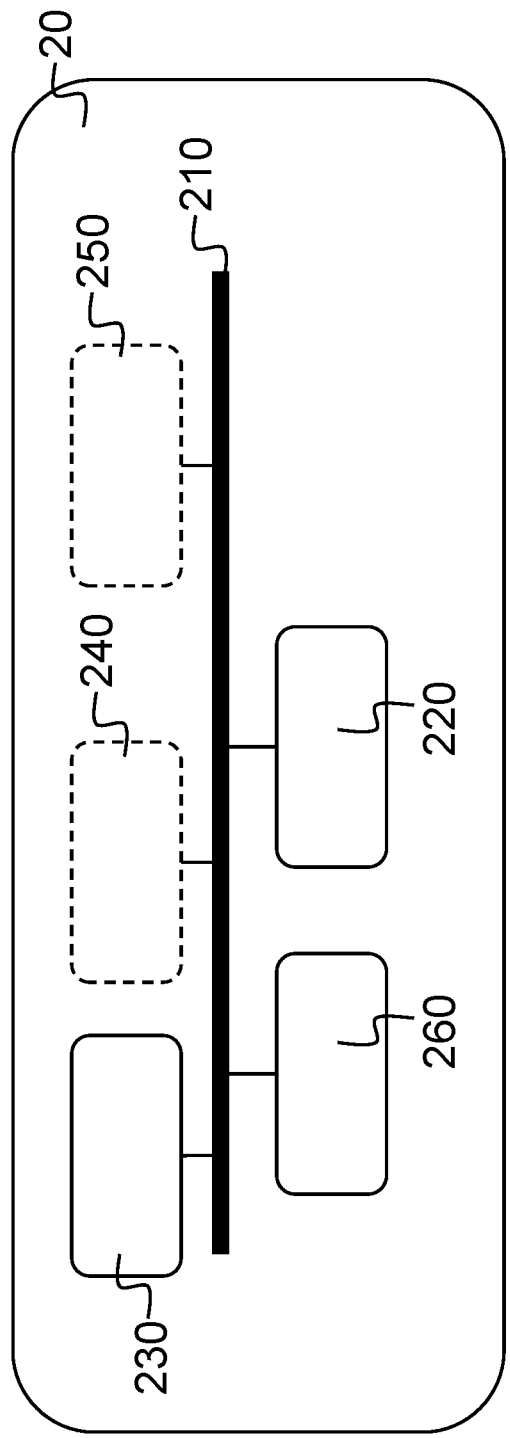
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
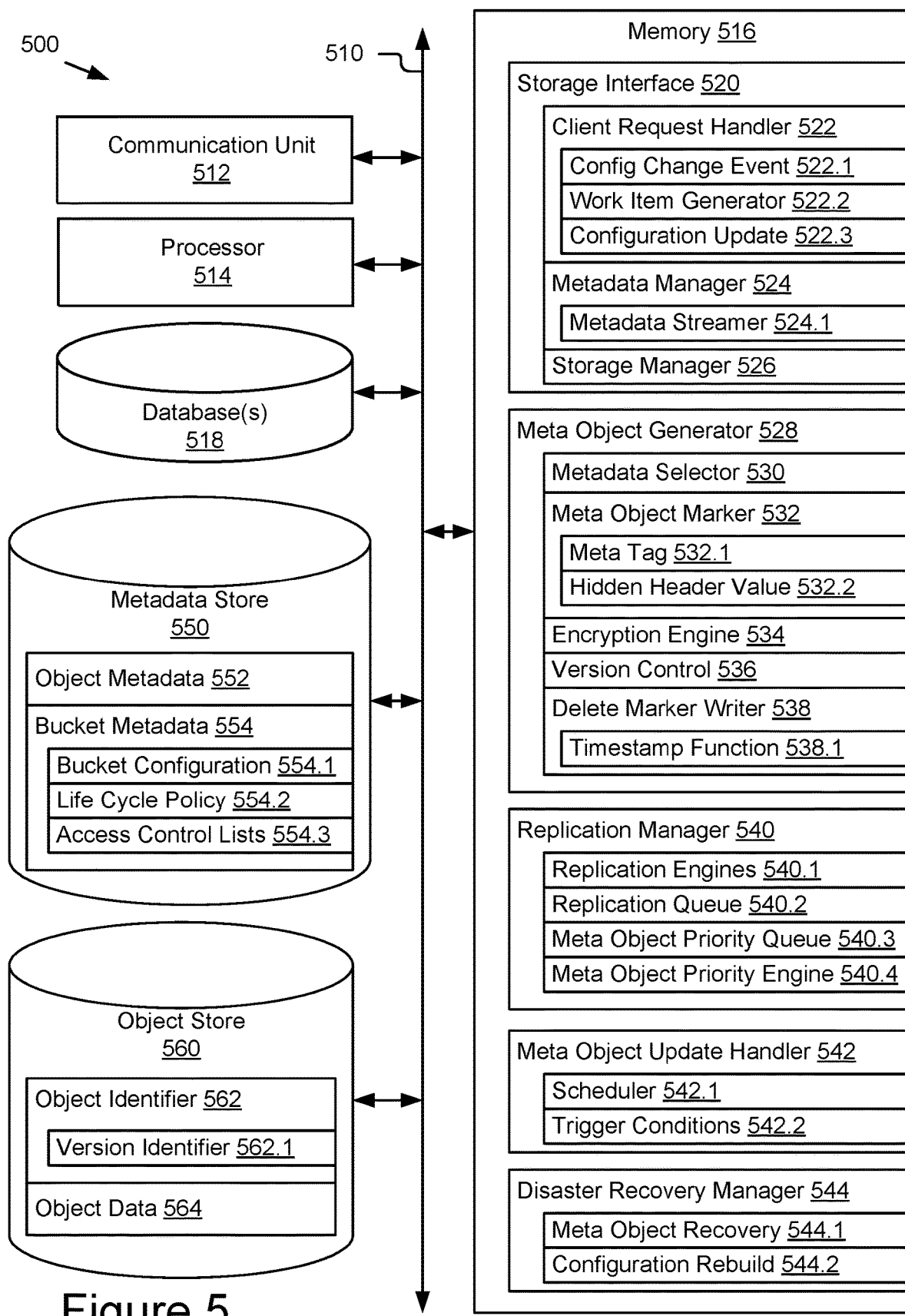
FIG. 5 schematically illustrates some example elements of an object storage system for the distributed storage system of FIG. 1.

FIG. 5 schematically shows selected modules of an access node or controller node with meta object replication and recovery, as well as supporting functions. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in an access node 20 with object storage management functions.

Object storage system 500 may include a bus 510 interconnecting at least one communication unit 512, at least one processor 514, and at least one memory 516. Bus 510 may include one or more conductors that permit communication among the components of object storage system 500. Communication unit 512 may include any transceiver-like mechanism that enables object storage system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such metadata store 550 and object store 560. Databases may include one or more data structures for storing, retrieving, indexing, searching, filtering, etc. of structured and/or unstructured data elements. In some embodiments, metadata store 550 may be structured as reference data entries and/or data fields indexed by metadata key value entries related to data objects stores in object store 560. Object store 560 may include data objects comprised of object data (such as host data), some amount of metadata (stored as metadata tags), and a GUID. Metadata store 550, object store 560, and/or other databases or data structures may be maintained and managed in separate computing systems, such as storage nodes, with separate communication, processor, memory, and other computing resources and accessed by object storage system 500 through data access protocols. Metadata store 550 and object store 560 may be shared across multiple object storage systems 500.

Object storage system 500 may include a plurality of modules or subsystems that are stored and/or instantiated in memory 516 for execution by processor 514. For example, memory 516 may include a storage interface 520 configured to receive, process, and respond to object data requests and/or configuration related commands from client systems or other nodes in distributed storage system 1. Memory 516 may include a meta object generator 528 for creating and storing meta objects in object store 560. Memory 516 may include a replication manager 540 for processing data object replication between storage nodes or storage systems, such as transferring or replicating data objects from object store 560 to other object stores. Memory 516 may include a meta object update handler 542 for managing updates to meta objects, such as in response to configuration changes. Memory 516 may include a disaster recovery manager 544 for recovering data objects from a replicated object store and rebuilding configuration data from recovered meta objects. In some embodiments, meta object generator 528, replication manager 540, meta object update handler 542, and/or disaster recovery manager 544 may be integrated into storage interface 520 and/or managed as separate libraries or background processes (e.g. daemon) through an API or other interface.

Storage interface 520 may include an interface protocol or set of functions and parameters for storing, reading, and otherwise managing data requests to object store 560. For example, storage interface 520 may include functions for reading, writing, modifying, or otherwise manipulating data objects and their respective client or host data and metadata in accordance with the protocols of an object storage system. In some embodiments, storage interface 520 may further enable management of configuration and operational parameters for object store 560, metadata store 550, and/or associated account, user, policy, and bucket configurations.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, and a storage manager 526. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client request handler 522.

Storage interface 520 may include one or more object storage configurations that define storage protocol used for validating, managing, and processing object data requests. For example, object storage configurations may generally define bucket configurations, life cycle policies, access control lists, version control, and other operational features for object storage system 500 and components thereof. In some embodiments, storage interface 520 may also handle requests to manage these various configurations and their corresponding parameter data. For example, configuration change requests with administrative user credentials may be received to change one or more configuration parameters stored in metadata store 550.

Client request handler 522 may include an interface and/or communication event-based condition for receiving object data requests and/or operational commands from one or more clients. For example, client systems may send an object data request over a network connection and addressed to object storage system 500 or a port or component thereof. Client request handler 522 may receive these requests and parse them according to the appropriate communication and object storage protocols. For example, client request handler 522 may identify a transaction identifier, a client identifier, an object identifier (object name or GUID), a data operation, and additional parameters for the data operation, if any, from the received message or messages that make up the object data request. Similarly, operational commands may include syntax and parameters for configuring or changing one or more configuration parameters, metadata, or initiating other management functions for object storage system 500 and/or object data buckets therein.

In some embodiments, client request handler 522 may be configured for managing client requests related to system or bucket configuration data. For example, object data buckets may be configured with parameter settings related to bucket configuration (e.g. enabled or disabled features), life cycle policy, access control lists, and other parameters stored in bucket configuration data. In some embodiments, configuration parameters may include default values and/or be created by a user or other system utility when a system, object store, bucket, or other logical group is created. For example, configuration parameters may be part of a creation request or definition of a resource submitted through a client system.

Client request handler 522 may include a detection algorithm or protocol for intercepting a configuration change request or command to generate a configuration change event 522.1. For example, upon receiving a request or command that includes a change to one or more configuration parameters, client request handler 522 may identify the configuration change and initiate a function for handling configuration change event 522.1. In some embodiments, storage interface 520 may detect configuration change event 522.1 from relevant log entries or metadata changes in metadata streamer 524.1, rather than directly identifying it from the client request.

In some embodiments, a work item generator 522.2 may respond to configuration change event 522.1 to generate one or more work items to be completed by other managers or engines, such as metadata manager 524, storage manager 526, meta object generator 528 and/or replication manager 540. For example, work item generator 522.2 may add work items to one or more task queues, including a metadata task to update configuration parameters through metadata manager 524, a meta object task for meta object generator 528 to generate or update a meta object storing the new or changed configuration data, a storage task for storage manager 526 to write the meta object into the relevant bucket, and/or a replication task for replication manager 540 to assure that the new or updated meta object is replicated to a disaster recovery object store or other backup system.

In some embodiments, client request handler 522 may include a configuration update protocol 522.3 that bypasses other processing queues or resource managers. For example, client request handler 522 may include logic for, responsive to the receipt or interception of configuration change event 522.1, access meta object generator 528 to generate the meta object, and directly replicate the meta object to the disaster recover data store. In parallel with metadata manager 524 writing the configuration data change to metadata store 550 and storage manager 526 storing the meta object in object store 560, configuration update protocol 522.3 may execute a PUT or similar command to store the meta object to another data store.

Metadata manager 524 may include interfaces, functions, and/or parameters for creating, modifying, deleting, accessing, and/or otherwise managing object metadata, such as object metadata 552 stored in metadata store 550. For example, when a new object is written to object store 560, at least one new metadata entry may be created in metadata store 550 to represent parameters describing or related to the newly created object. Metadata manager 524 may generate and maintain object metadata 552 that enables metadata manager 524 to locate object metadata within metadata store 550. For example, metadata store 550 may be organized as a key-value store and object metadata 552 may include key values for data objects and/or operations related to those objects that are indexed with a key value that include the object identifier or GUID for each object. In some embodiments, metadata manager 524 may also manage object metadata stored in object store 560 with object data 564. Metadata manager 524 may work in conjunction with storage manager 526 to create, modify, delete, access or otherwise manage object metadata stored as object tags 566 within object store 560.

In some embodiments, metadata manager 524 may include metadata streamer 524.1 for making metadata logs available for post-processing by other system components. For example, metadata streamer 524.1 may replay log data representing metadata changes, including changes to configuration data stored in metadata store 550. In some embodiments, metadata streamer 524.1 may be used to parse metadata transaction logs, such as metadata transaction logs that contain configuration data changes, to identify changes in configuration data. Detected changes may be used to identify configuration change event 522.1 and/or parameters that should be included in the next meta object by metadata selector 530.

Storage manager 526 may include interfaces, functions, and/or parameters for reading, writing, and deleting object data elements in object store 560. For example, object PUT commands may be configured to write object identifier 562, object data 564, and/or object tags to object store 560. Object GET commands may be configured to read data from object store 560. Object DELETE commands may be configured to delete data from object store 560, or at least mark a data object for deletion until a future garbage collection or similar operation actually deletes the data or reallocates the physical storage location to another purpose.

Other object storage commands may be handled by storage manager 526, including special functions defined for version control. Object storage commands processed by storage manager 526 may include parameters for accessing special functions and/or metadata resources stored with host or client data in the data objects. Storage manager 526 may work in conjunction with metadata manager 524 for managing object metadata, including versioning information. Storage manager 526 may work with meta object generator 528 to store and retrieve metadata objects in object store 560. Storage manager 526 may work in conjunction with replication manager 540 to replicate or migrate data from object store 560 to another data store. For example, storage manager 526 may read the object store 560 for transfer by one or more replication engines managed by replication manager 540.

In some embodiments, metadata store 550 may be distributed across multiple systems, such as a plurality of access systems. Metadata store 550 and/or portions thereof may be sharded data stores, wherein the data stores are partitioned into segments stored in different computing systems. Storage interface 520 may include the functions for locating and accessing relevant portions of the sharded database.

Meta object generator 528 may be invoked by storage interface 520 to generate meta objects for operating data that is managed separately from user data. For example, meta object generator 528 may be configured to receive configuration change event 522.1 or a work item for meta object creation or update and return a meta object capturing the desired configuration data in the object data of the meta object. Meta object generator 528 may provide interfaces, functions, and parameters for managing the generation of one or more configurations of meta objects for storing operating or configuration data that is used for management of object storage system 500, but should not be exposed to users through common object storage requests, such as GET or list objects. Meta object may be special data objects that are stored alongside user data objects in data object buckets, but are effectively invisible to users without special access credentials and/or knowledge of specialized commands and header values to read or otherwise manipulate such objects. In some embodiments, meta object generator 528 may include a metadata selector 530, a meta object marker 532, an encryption engine 534, version control 536, and/or a delete marker writer 538.

In some embodiments, metadata selector 530 may include logic for selecting and formatting metadata from metadata store 550 to be included in the meta object data of meta objects. For example, metadata selector 530 may be configured to select configuration data that may be needed for repairing lost metadata or configuring a recovered or replacement system from replicated data objects. In some embodiments, metadata selector 530 may include a template for selecting relevant configuration data for rebuilding bucket metadata 554, such as bucket configuration parameters 554.1, life cycle policy parameters 554.2, and user access control lists 554.3. In the event that the original bucket metadata is corrupted or lost in a failed object storage system, the bucket metadata may be recovered from the corresponding meta object data, such as by using the template or embedded configuration data identifiers to map the configuration data into the new metadata store. In some embodiments, metadata selector 530 may define the meta object data stored in the meta object.

In some embodiments, meta object marker 532 may include logic for generating meta object marker values that may be appended to the object identifier, such as a GUID, of a meta object to identify it as a meta object that is different from a user data object. For example, a prefix or suffix may be added to the object key to enable systems and/or users to identify meta objects as not being user data objects and containing system operating or configuration data that should not be manipulated by ordinary users. In some embodiments, meta objects may be configured for replication to a heterogeneous data store that limits the type of meta object marker that can be managed by the destination system. For example, a cloud S3 bucket may have a limited API control path. In this case, the client application may include a user configurable meta object marker, such as a meta tag 532.1, that is appended to the beginning of the GUID. For example, the default value for meta tag 532.1 may be ".meta-". However, other values for meta tag 532.1 may be possible, so long as system user, administrators, and system functions for accessing (or denying access) to meta objects are configured to recognize the meta tag value. The client application may be configured to ignore and/or hide objects that include meta tag 532.1. In some embodiments, users may be given an option to specify one or more meta tags for use on their systems as part of system replication configuration on the source system. For example, this may enable the users to select meta tag 532.1 that will not conflict with any other object naming conventions used for user data objects.

In some embodiments, meta object marker 532 may include a hidden header value 532.2 that provides additional protection for limiting user access to meta objects. For example, between replication systems with greater replication API control and/or common meta object handling protocols, hidden header value 532.2 may include a custom header value known only to the object storage systems and/or special superuser utilities for accessing meta objects containing hidden header value 532.2. In order to access any meta object, hidden header value 532.2 may be required as part of the object data request. Meta object generator 528 may include hidden header value 532.2 when the meta object is created and stored to object store 560. Hidden header value 532.2 may be accessed by replication manager 540 for replicating the meta object. Hidden header value 532.2 may be accessed by disaster recovery manager 544 to read the meta object and recover configuration data from the meta object data. An example hidden header value 532.2 could be a random value, such as a 32 bit random number, but a hidden header value could be almost any value unknown to users and system functions not meant to access meta objects.

In some embodiments, meta object marker 532 may include both meta tag 532.1 and hidden header value 532.2. An example object key format for meta object marker 532 may be <meta tag 532.1><GUID><Bucket Identifier><hidden header value 532.2>, such as ".meta-<32-38 character long source_system_GUID>_<3-64 character long source_bucket_name>_<32 bit random number>.

In some embodiments, encryption engine 534 may include interfaces, functions, and/or parameters for encrypting meta object data prior to writing it in object store 560 or replicating it to another data store. For example, the configuration data selected by metadata selector may be encrypted before being written by storage manager 526. In some embodiments, storage manager 526 may include an encryption path for storing, retrieving, and otherwise managing encrypted storage objects. Encryption engine 534 may be accessible to storage manager 526 and/or other components of object storage system 500 for encrypting and decrypting object data. In some embodiments, encryption engine 534 may include a meta object encryption key or special encryption algorithm that is used only for encrypting meta objects and is not accessible to most users and system resource. In some embodiments, encryption engine 534 is invoked automatically by meta object generator 528 such that all meta object created or updated by meta object generator include encrypted meta object data.

Version control 536 may be invoked by meta object generator 528 to manage version control for one or more meta objects. For example, if versioning is enabled, each time the same meta object name is written, a new meta object version may be created. Similarly, which meta object version is returned from a read operation may be determined by a version identifier included as a parameter of the meta object read operation and/or may default to the most recent version. In some embodiments, version control 536 may be a standard configuration setting within storage interface 520, such as within library functions used by client request handler 522, metadata manager 524, and/or storage manager 526. For example, user data objects may use version control following the same syntax and handling as meta objects.

Version control 536 may include one or more parameters, data structures, and/or related methods for manipulating those parameters or data structures. In some embodiments, version control 536 may force all meta objects to have versioning enabled regardless of whether it is enabled at the bucket level or through other configuration settings.

In some embodiments, version control 536 may assign a version identifier to each version of a meta object. For example, version control 536 may include an algorithm or version control function for generating unique ordered version identifiers for each version of an object. In some embodiments, version control 536 may base version identifiers on a creation timestamp for the object version. For example, when the object version is created, the creation timestamp for that object is used as the version identifier or processed through a transfer function to determine the version identifier. The version identifier may be appended to the object name or otherwise stored in metadata associated with the meta object to identify the meta object version and enable selective access of meta object versions.

Delete marker writer 538 may include functions, methods, or operations for generating a version controlled delete marker, both object configuration and metadata. For example, when a delete event is identified for a versioned data object, such as processing a delete command for the versioned data object that is received by storage interface 520, delete marker writer 538 may generate a data object version with no host data (or a host data object size of 0) and a version field that identifies the object version as a delete marker. This delete marker object version may have the same data object name (like any other object version) and be managed and transferred like any other object version for the versioned data object.

In some embodiments, delete marker writer 538 may be configured to generate a crafted delete marker for meta objects that is different from the delete markers used in versioned user objects, such as a delete marker that includes a higher version number than would normally be generated. For example, delete marker writer 538 may use a special timestamp function 538.1 for generating the version identifier or otherwise identifying the order of the versions for the meta object. Timestamp function 538.1 may be configured to generate a greater version value for meta object delete markers. For example, the timestamp function may include a transfer function, such as a multiple or an added value that increases the timestamp value for calculation of the version identifier. In some embodiments, meta object generator 528 may invoke delete marker writer 538 for a delete marker with a greater version identifier and then generate a meta object version using a normal timestamp function that still sets behind the previously generated delete marker in version order.

Replication manager 540 may include functions, methods, or operations for managing the transfer of data objects, including meta objects and user data objects, to other object stores or object storage systems. For example, replication manager 540 may manage one or more replication engines 540.1 that move data objects from object store 560 to a destination object store that may be remote from object store 560. Replication manager 540 may be configured to transfer data objects between heterogeneous data stores. In some embodiments, replication manager 540 transfers each data object identified for replication, including object identifiers 562, object data 564, and associated object metadata, such as metadata tags, using replication and data transfer protocols for moving data objects between systems. In some embodiments, replication manager 540 may also transfer object metadata 552 associated with the data object from a corresponding metadata store, such as metadata store 550.

In some embodiments, replication manager 540 may be configured for asynchronous data transfers. Replication manager 540 may include a replication queue 540.2 for organizing and ordering data objects for replication. For example, a scheduler may select objects for transfer based on criteria other than the order in which they were ordered within object store 560, such as object size, availability, etc. The scheduler may order the data objects for replication in replication queue 540.2. In some embodiments, multiple replication engines 540.1 may operate in parallel, using independent processing threads, and transfer data objects at similar times and using resources and paths that may result in different transfer rates. In some embodiments, replication queue 540.2 may include user data objects and meta objects scheduled for replication and user data objects and meta objects may be interleaved in the same replication queue 540.2 and/or replicated using the same replication engines 540.1.

In some embodiments, meta objects may be managed differently from user data object for replication, such as to give priority to meta objects to assure that they are replicated more reliably and in a more timely manner. For example, a meta object priority queue 540.3 may be provided for meta objects. As meta object replication tasks are received, they may be added to meta object priority queue 540.3. When a replication engine is available to transfer a next data object, it may first check the meta object priority queue 540.3 to select the next data object. If a meta object is present in meta object priority queue 540.3, then it will be selected for replication by the available replication engine. The available replication engine will only select a user object from the normal replication queue if no meta objects are present in meta object priority queue 540.3, giving priority processing to the transfer of meta objects.

In some embodiments, a meta object priority engine 540.4 may be configured as a priority replication engine for transferring meta objects and may not be invoked for the transfer of user objects. For example, meta object priority engine 540.4 may only transfer meta objects, such as from meta object priority queue 540.3. When no meta objects are available for replication, meta object priority engine 540.4 may be idle and watch for a meta object work task to be added to meta object priority queue 540.3 in order to process meta object replication tasks without having to wait for another replication engine to complete its user data object transfer. In some embodiments, meta object priority engine 540.4 may be executed by a dedicated processing thread. For example, even if meta object priority engine 540.4 is supported by the same processor or group of processors as replication engines 540.1, a dedicated processing thread may be allocated to the priority engine to enable access to processing capacity without waiting for another thread to be initialized or become available.

Meta object update handler 542 may include a command, interface protocols, data structure, and/or a set of functions and parameters for managing updates to meta objects. For example, meta object update handler 542 may define a schedule and/or trigger conditions for generation and/or replication of meta objects. In some embodiments, client request handler 522 may not be configured to intercept or detect configuration changes. In such configurations, generation of meta object to backup configuration data may be handled based on a backup schedule rather than real-time identification of configuration change event 522.1. For example, a selection of configuration data may be used to generate a new or updated meta object on a periodic basis. Meta object update handler 542 may include a scheduler 542.1 that allows an administrative user or system utility to define a schedule for the meta object generation. In some embodiments, scheduler 542.1 may allow the selection of a time of day, elapsed time, or other period for generating new or updated meta objects. Scheduler 542.1 may include a schedule for all configuration data subject to meta object backup or may include settings or parameters for each bucket configuration or similar subunit or type of configuration data. In some embodiments, scheduler 542.1 may also allow a definition of the configuration data to be backed up for use by metadata selector 530. Scheduler 542.1 may also define whether the meta object is immediately replicated to a disaster recovery data store (or added as a work item in an appropriate replication queue), include a separate definition of replication schedule, or rely on the default replication schedule for data objects (including meta objects) in the related bucket or data store.

In some embodiments, meta object update handler 542 may be configured to use one or more trigger conditions 542.2 for generating meta objects. For example, trigger conditions 542.2 may be based on criteria other than time period, though some trigger conditions may include time-based conditions, and may include user configurable parameters. In some embodiments, trigger conditions 542.2 may be used by client request handler 522 to determine which requests or real-time configuration change events should generate an actionable configuration change event 522.1. For example, trigger conditions 542.2 may define a set of criteria identifying specific configuration parameters that, if changed, trigger a meta object update.

Disaster recovery manager 544 may include a command, interface protocols, data structure, and/or a set of functions and parameters for rebuilding a data store or segment thereof (such as a bucket) after the failure or corruption of an original data store. For example, if object storage system 500 fails, the recovered system and/or a replacement system may be installed with similar system software, including disaster recovery manager 544. Disaster recovery manager 544 may then be tasked with recovering the data objects and configuration information from one or more disaster recover data stores in order to replace the failed system.

In some embodiments, disaster recovery manager 544 may, for each object data bucket being recovered, initialize a new data bucket and execute an object recovery function to replicate all data objects, including user data objects and meta objects, to the new data bucket. Disaster recovery manager 544.1 may then use meta object recovery 544.1 to access configuration data, such as bucket metadata, stored in any recovered meta objects. In some embodiments, meta object recovery 544.1 may be able to evaluate multiple meta objects or versions of meta objects to determine the most recent configuration data for use in configuring the object data bucket being recovered. For example, version identifiers, timestamps, and/or the configuration parameters contained in any given meta object may be read to assemble the most recent configuration data that had been stored in the recovered meta objects.

Configuration rebuild 544.2 may include a function to write the configuration parameters recovered from the meta objects to the appropriate locations in metadata store 550 to configure the new data bucket to match the configuration settings of the failed bucket. In some embodiments, configuration rebuild 544.2 may access a bucket configuration API to make the parameter changes necessary to replicate the lost bucket configuration. In some embodiments, disaster recovery manager 544 may execute the initial data object recovery, meta object recover 544.1, and/or configuration rebuild 544.2 on an automated basis without intervention from a user. For example, disaster recovery manager 544 may include a script executed once the new system is initialized with one or more identifiers for the data object buckets to be restored and the disaster recovery data stores containing the replicated data objects.

Memory 516 may include additional logic and other resources (not shown) for processing object data requests, such as modules for generating, queueing, and otherwise managing object data requests. Processing of an object data request by storage interface 520 may include any number of intermediate steps that yield at least one data request to the distributed storage system.

Figure 6:
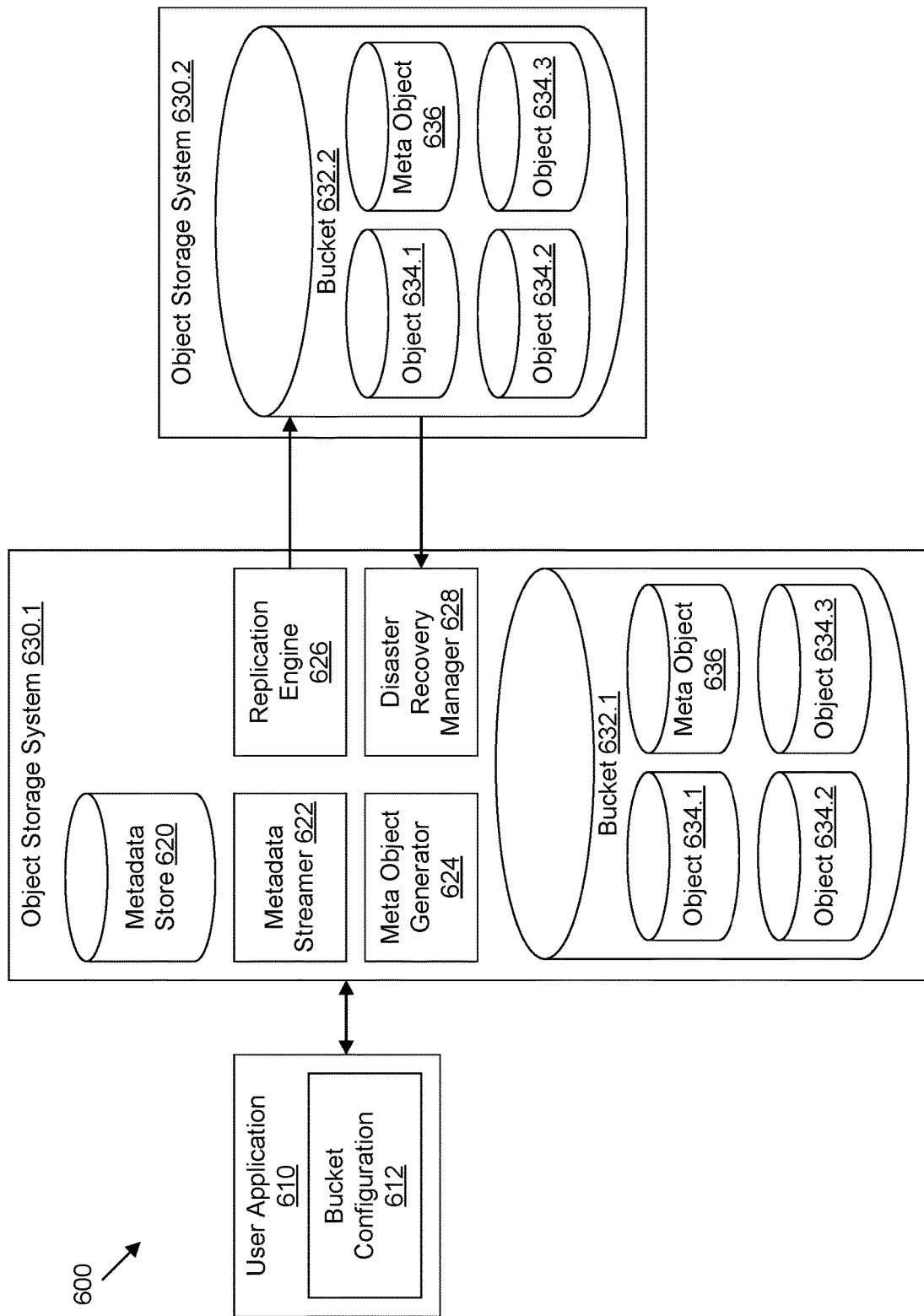
FIG. 6 schematically illustrates data objects transferred between example object storage systems.

FIG. 6 shows an example distributed object storage system 600 that includes object storage systems 630.1 and 630.2 accessible through user application 610. In some embodiments, object storage system 630.1 may be configured similarly to object storage system 500 in FIG. 5 and object storage system 630.2 may be configured as a backup or disaster recover data store for object storage system 630.1.

User application 610 may include one or more user applications configured to store and retrieve data elements from object storage system 630.1. In some embodiments, user application 610 may be configured to read, write, and otherwise manage data elements as data objects using a data system interface API, such as S3, to GET, PUT, DELETE, etc. user data objects. User data objects 634.1, 634.2, and 634.3 may include data objects configured to store application data used by user application 610. User data objects 634.1, 634.2, and 634.3 may not include operating data for object storage system 630.1 within the object data, though operating data for accessing and managing user data objects 634 may be included in metadata tags and/or associated with user data objects 634 though metadata store 620.

In some embodiments, user application 610 may include one or more utilities for configuring how object storage system 630.1 manages user data objects associated with user application 610. For example, user application 610 may include or provide access to a bucket configuration module 612 that allows the user to set and modify one or more configuration parameters for each bucket associated with user application 610, such as bucket 632.1. Bucket configuration module 612 may enable a user to setup one or more object data buckets used by user application 610, such as bucket 632.1, and select and/or change configuration parameters for each bucket over time. Bucket configuration changes made through bucket configuration module 612 may be sent to object storage system 630.1 as metadata requests or commands that change the bucket configuration parameters stored in metadata store 620.

Object storage system 630.1 may be configured to store bucket configuration data that is operationally stored in metadata store 620 into one or more meta objects, such as meta object 636. For example, object storage system 630.1 may use meta object generator 624 to select bucket configuration data from metadata store 620 and stored in the object data of meta object 636. In some embodiments, meta object generator 624 may be responsive to bucket configuration changes as they are received from user application 610. For example, object storage system 630.1 may intercept configuration change commands and directly respond or queue a work item to generate an updated meta object 636. In some embodiments, meta object generator 624 may be configured to periodically update meta object 636 based on a schedule to periodically fetch the bucket metadata. For example, object storage system 630.1 may use metadata streamer 622 to parse changed or delta metadata transaction logs to identify configuration changes and initiate an update of meta object 636. In some embodiments, periodic updates of meta object 636 may simply capture the current bucket configuration parameters without regard to whether or not they have changed.

Once meta object generator 624 has generated a meta object for the original, current, and/or updated bucket configuration data, replication engine 626 may push meta object 636 to object storage system 630.2. For example, each time an updated meta object 636 is generated, a replication work item may be queued for replication engine 626 to put the meta object to object storage system 630.2, such as using an S3 put command and other protocols defined by the S3 API. In some embodiments, the user may configure how often meta object 636 is updated and/or replicated to object storage system 630.2. For example, a user may configure bucket configuration backups to be processed daily or per another user defined time period or set of trigger conditions.

In some embodiments, meta object 636 may be replicated from bucket 632.1 of object storage system 630.1 to bucket 632.2 of object storage system 630.1 as part of a periodic backup or update of user data objects 634. For example, replication engine 626 may periodically write all data objects and/or all changed data objects in bucket 632.1 to bucket 632.2. Selected data objects, such as all changed data objects, may include user data objects 634 and meta object 636 for transfer to object storage system 630.2 using replication engine 626.

Object storage system 630.1 and/or a successor object storage system configured similarly to object storage system 630.1 may include disaster recovery manager 628 for recovering meta object 636 and user data objects 634 from object storage system 630.2. For example, original object storage system 630.1 may be lost completely. A new system may be provisioned by a customer or user to host a recovered version of bucket 632.1. The data objects may be restored from object storage system 630.2, such as using a disaster recovery feature embodied in disaster recovery manager 628 in the newly provisioned system. In some embodiments, disaster recovery manager 628 may identify the location of disaster recovery buckets, such as bucket 632.2, and identify meta object 636. Disaster recovery manager 628 may recover meta object 636 and use it to extract bucket configuration data to repopulate the bucket configuration parameters in metadata store 620. The disaster recovery process may use one or more meta objects to create buckets on the replacement system with the same configuration properties that were replicated in the meta objects. For example, once bucket 632.1 is properly reconfigured in accordance with its most recently backed up bucket configuration in meta object 636, disaster recovery manager 628 may restore user data objects 634. As a result, the recovered bucket 632.1 and user data objects 634 may be placed back into production support of user application 610 without any change to user application 610 and/or bucket configuration module 612.

Figure 7:
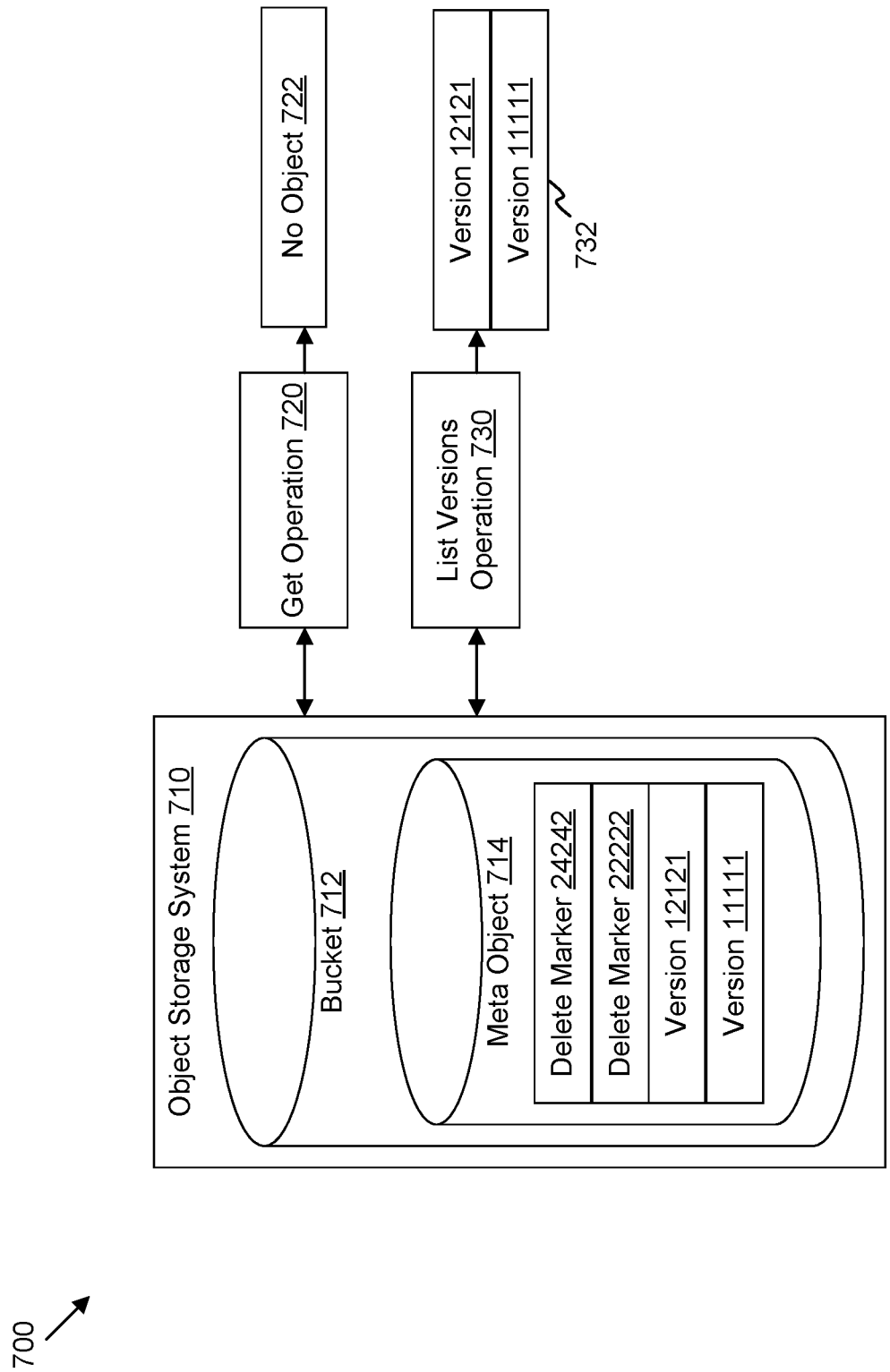
FIG. 7 schematically illustrates example operations executed against an example meta object in an object storage system.

FIG. 7 shows an example distributed object storage system 700 that includes object storage system 710 and example operations 720 and 730. In some embodiments, object storage system 710 may be configured similarly to object storage system 500 in FIG. 5. As shown, object storage system 710 may include an object storage bucket 712 configured to store a meta object 714. Meta object 714 may be stored as a data object with versioning enabled, such that meta object 714 is comprised of a series of object versions with a defined order. For example, versions 11111 and 12121 may include meta object data and the object version with the highest version identifier, such as meta object version 12121, may be treated as the most recent version of meta object 714.

In some embodiments, each object version for meta object 714 may also generate a corresponding delete marker, such as delete markers 22222 and 24242. Delete markers 22222 and 24242 may be managed as object versions with version identifiers. Object storage system 710 may manage versioned data objects with delete markers according to specific protocols that remove them from valid data objects for normal data operations, such as GET commands. Because meta object 714 includes one or more delete markers, it may be rendered invisible and/or inaccessible to some data operations under the storage API used by object storage system 710. In some embodiments, the delete marker should possess a version identifier or other indicator of version order that shows the delete marker to be more recent than the corresponding version. In some embodiments, it may be preferable to write the delete marker first, to assure that the meta object maintains its "deleted" condition through a subsequent write of the latest meta object version. Otherwise, the meta object version could be exposed as an active object version while the delete marker version is being processed. For example, object storage system 710 may include an algorithm for generated a crafted delete marker that has a higher version identifier or otherwise places it as the most recent version and leaves a gap into which the latest meta object version can be inserted. So, when version 11111 was to be written at time 11111, delete marker 22222 was first written with double the timestamp value to assure that the delete marker would be the most recent version, even if there was some lag in processing meta object version 11111. When version 12121 was subsequently written at time 12121, delete marker 24242 was written with double the timestamp value to place it ahead of meta object version 12121.

Get operation 720 may represent standard data object access operations intended to access or return the most recent version of a data object. Because the most recent version of meta object 714 is delete marker 24242, GET operation 720 specifying meta object 714 may return no object 722 or a similar error message or response value. However, versioned data objects may support special version commands for identifying prior versions of an object and enabling users to access non-current versions of a versioned data object, such as recovering an earlier version of the object. For example, list version operation 730 may return a list of all versions for meta object 714. So, command results 732 may include version numbers for version 11111 and 12121. An administrative user could then use a version get command specifying both the meta object identifier and the most recent object version number (and ignoring delete markers) to access the most recent object version 12121 of meta object 714.

Figure 8:
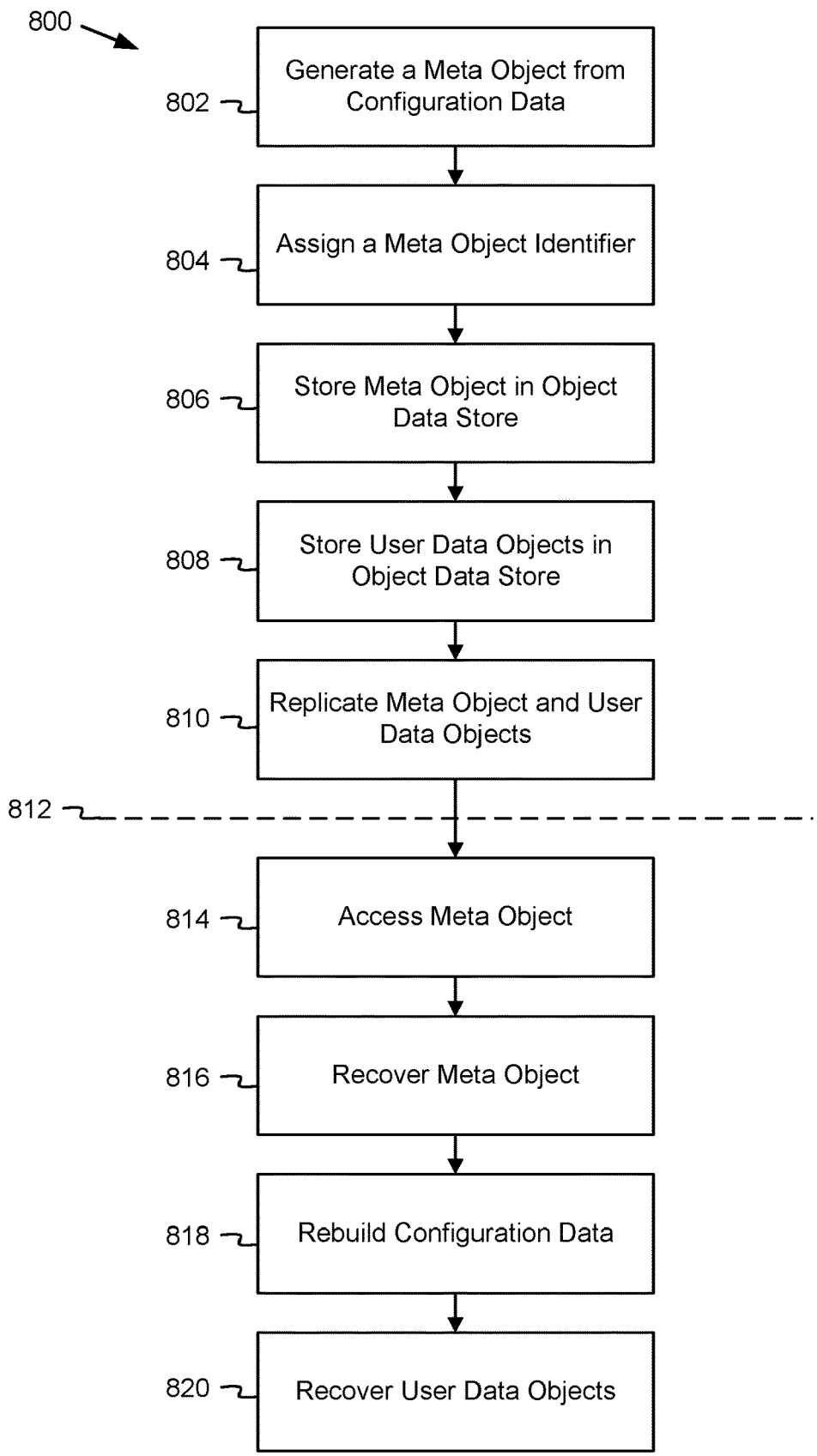
FIG. 8 illustrates an example method for replicating and recovering user data objects and meta objects.

As shown in FIG. 8, the object storage system 500 may be operated according to an example method of using meta objects to replicate and recover configuration information for disaster recovery, i.e. according to the method 800 illustrated by the blocks 802-820 of FIG. 8.

At block 802, a meta object may be generated from configuration data. For example, one or more configuration parameters for a bucket configuration may be selected from a metadata store and used to populate the object data of a meta object.

At block 804, a meta object identifier may be assigned to the meta object. For example, when the meta object is generated at block 802, an object identifier, such as a GUID or object name, is assigned to the meta object and one or more meta object markers may be added to identify the meta object as a meta object. In some embodiments, a meta object tag may be added to the object identifier and a hidden header value may be generated and included in metadata tags and/or metadata key values associated with the meta object.

At block 806, the meta object may be stored in an object data store. For example, the meta object containing bucket configuration data may be stored in the object data bucket that it describes.

At block 808, user data objects may also be stored in the object data store. For example, user data objects that are used for one or more user applications associated with the object data bucket may be stored, read, modified, and/or deleted in the normal course of application operations in the bucket. While block 808 is shown following block 806, storage of user data objects may be occurring throughout method 800, largely independent of the preceding blocks.

At block 810, data objects may be replicated from the object data store to another object data store, such as a disaster recovery backup data store. For example, as the meta object and user data objects are generated and/or updated, they may be added to one or more replication queues to be replicated from the original object store to a secondary object store according to a replication schedule or policy for the object store and/or bucket. Blocks 802-810 may repeat throughout the operating life of the original data store and/or bucket therein.

Line 812 may represent a failure event for the original object data store and/or object data bucket that renders configuration data and/or data objects stored in the object data bucket inaccessible, such as one or more device or system failures. For example, the original object storage system may fail. As a result, a new object storage system may be provisioned to replace the failed system and be loaded with similar object storage system software. The new object storage system, referred to as a replacement object storage system or recovery object storage system, may not initially include the lost data objects and configuration data and may initiate a disaster recovery protocol based on the secondary object storage system to which the meta object(s) and user data objects were replicated.

At block 814, the replacement object storage system may access the meta object stored in the backup object storage system. For example, the disaster recovery protocol may identify a bucket for recovery and the corresponding bucket on the secondary system, then use the meta object identifier, with meta object tag and hidden header value, to GET the most recent version of the meta object.

At block 816, the meta object may be recovered to the replacement object storage system. For example, the meta object may be stored in the replacement object storage system where its object data can be read.

At block 818, the configuration data may be rebuilt in the replacement object storage system. For example, the bucket configuration parameters may be read from the meta object data and written into appropriate entries in the recovery metadata store of the replacement object storage system or otherwise used to initialize and configure a replacement object data bucket corresponding to the lost bucket.

At block 820, user data object may be recovered back to the replacement object storage system. For example, once the replacement bucket is properly configured based on the configuration data from the meta object, the user data objects that were stored in that bucket may be replicated from the secondary object storage system to create a recovered object data bucket that operates similarly to the lost data bucket without requiring further configuration by a user or modification of the user application(s). Blocks 814-820 may be completed for each object data bucket that was lost in the original object storage system and for which meta objects describing bucket configurations can be found among disaster recovery object data stores.

Figure 9:
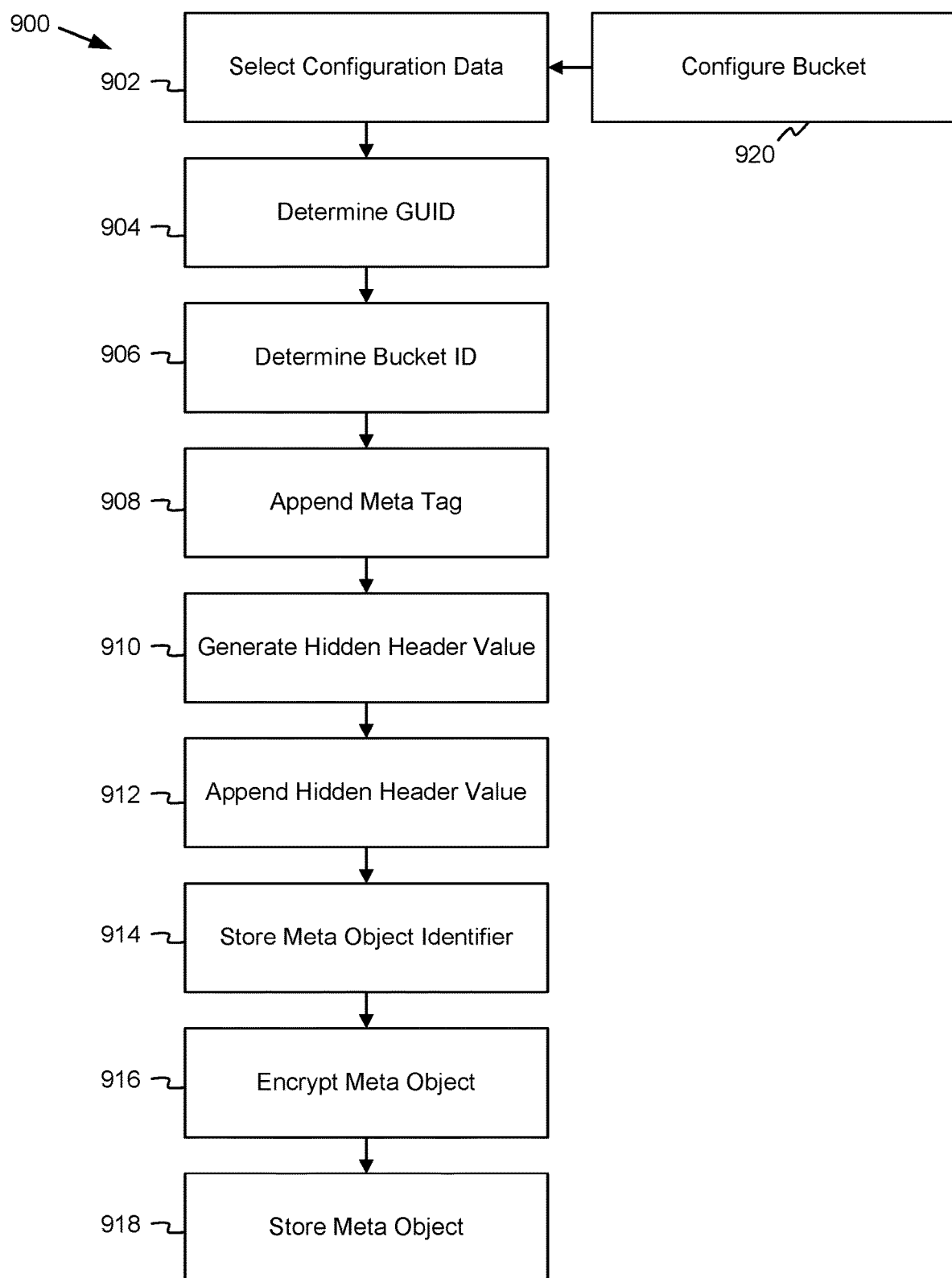
FIG. 9 illustrates an example method of generating and storing a meta object based on configuration data.

As shown in FIG. 9, the object storage system 500 may be operated according to an example method of generating a meta object, i.e. according to the method 900 illustrated by the blocks 902-920 of FIG. 9.

At block 902, configuration data or other operating data may be selected for inclusion in a meta object. For example, a set of bucket configuration parameters may be identified for a target data bucket.

At block 904, a GUID or other data object name may be determined for the meta object. For example, any time a new data object is created, the object storage system may include logic for assigning a GUID to assure that each data object managed by the system is uniquely identifiable.

At block 906, a bucket identifier or other control entity identifier may be determined for the meta object. For example, in an object storage system organized in object data buckets, any new data object may be generated for storage in a selected bucket and that bucket's unique bucket identifier may be associated with the object at creation.

At block 908, a meta tag may be appended to the object identifiers for the meta object. For example, a meta tag may be prepended to the GUID to designate the meta object as a meta object.

At block 910, a hidden header value may be generated for the meta object. For example, the hidden header value may be a numeric key, code, or randomly generated value that is only associated with meta objects and is not generally visible to users or system functions not intended to operate on meta objects.

At block 912, the hidden header value may be appended to the object identifier for the meta object. For example, the hidden header value may be added as a header value in the object identifier.

At block 914, the meta object identifier may be stored for the meta object. For example, a key value and/or one or more metadata tags may be stored in metadata associated with the meta object and include the GUID, bucket ID, meta tag, and/or hidden header value.

At block 916, the meta object may be encrypted. For example, a data object encryption engine may encrypt the object data and/or metadata tags included with the meta object. In some embodiments, the encryption engine may also add encryption related fields that are used by a receiving or retrieving system to decrypt the encrypted data.

At block 918, the meta object may be stored to an object data store. For example, the meta object may be written to the object data store in the object storage system generating the meta object. In some embodiments, the meta object may be put to a remote object data store and/or may be replicated from the initial object store in which it is written to one or more other object stores, such as a disaster recovery object data store.

At block 920, a bucket or other configurable entity may be configured. For example, configuration of the data bucket or another set of configuration settings may be configured prior to selecting the configuration data at block 902.

Figure 10:
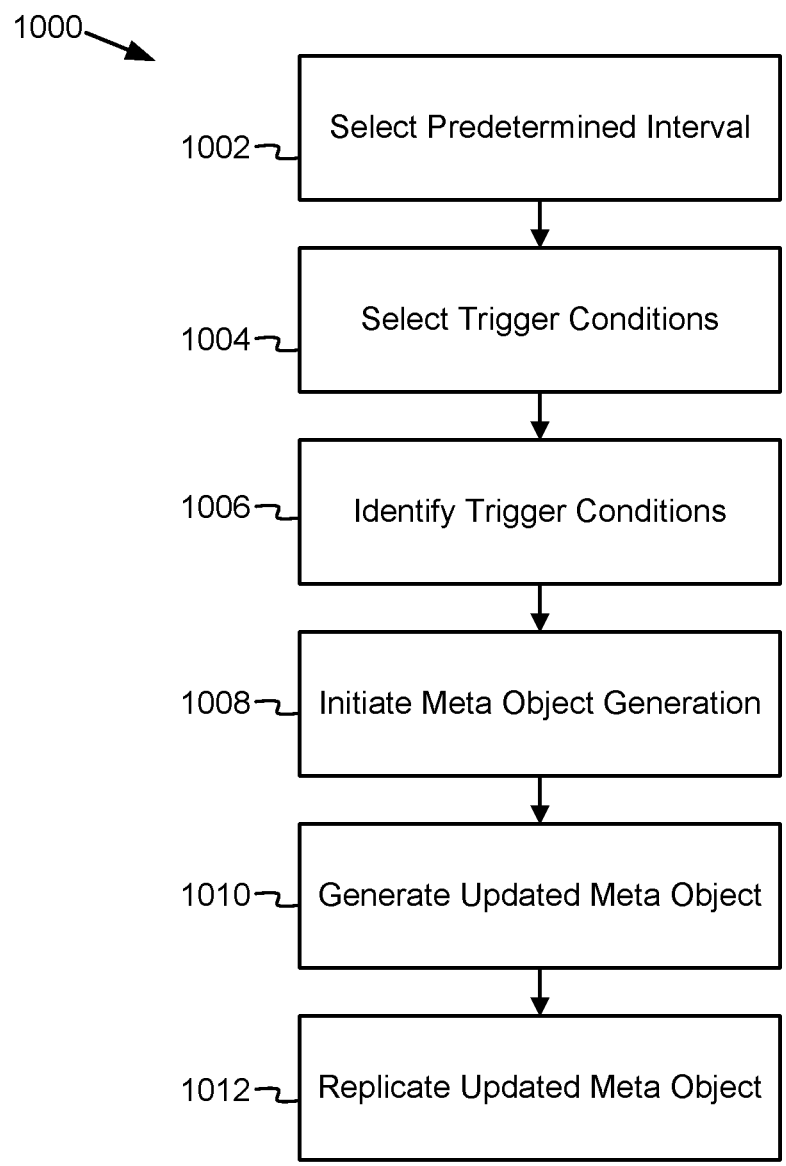
FIG. 10 illustrates an example method of updating meta objects.

As shown in FIG. 10, the object storage system 500 may be operated according to an example method of updating meta objects, i.e. according to the method 1000 illustrated by the blocks 1002-1012 of FIG. 10.

At block 1002, a predetermined interval may be selected for initiating meta object updates. For example, an administrative user may configure an object storage system, object data store, or individual bucket to update meta objects daily at a particular time, every X hours, or every Y transactions.

At block 1004, one or more trigger conditions may be selected for initiating meta object updates. For example, a user may define specific types of updates that trigger an immediate meta object update, such as changes in select parameters, changes to a percentage of parameters over a certain threshold, or an increase in error rates or other risk factor for system failure. In some embodiments, both predetermined intervals and other trigger conditions may be defined for particular configuration, while others may select one or the other.

At block 1006, the trigger conditions, possibly including elapsed time interval, may be identified. For example, a timer may reach the elapsed time since the prior update or a client request handler may intercept a parameter change in a client request and a flag may be set or a message sent indicating that a meta object update is due.

At block 1008, meta object generation may be initiated responsive to block 1006. For example, a meta object generator may be initiated based on the identified trigger conditions. If no prior version of the meta object exists, a new meta object may be generated, such as according to method 900 of FIG. 9.

At block 1010, an updated meta object may be generated for an existing meta object or related set of configuration data. For example, the updated meta object may include changed parameters written to a new meta object, a new version including the changed parameters for a versioned meta object, or a complete meta object intended to overwrite or delete the prior meta object.

At block 1012, the updated meta object may be replicated to another data store for backup or disaster recovery. For example, the updated meta object may be replicated to the associated disaster recovery data store for the bucket the meta object is associated with.

Figure 11:
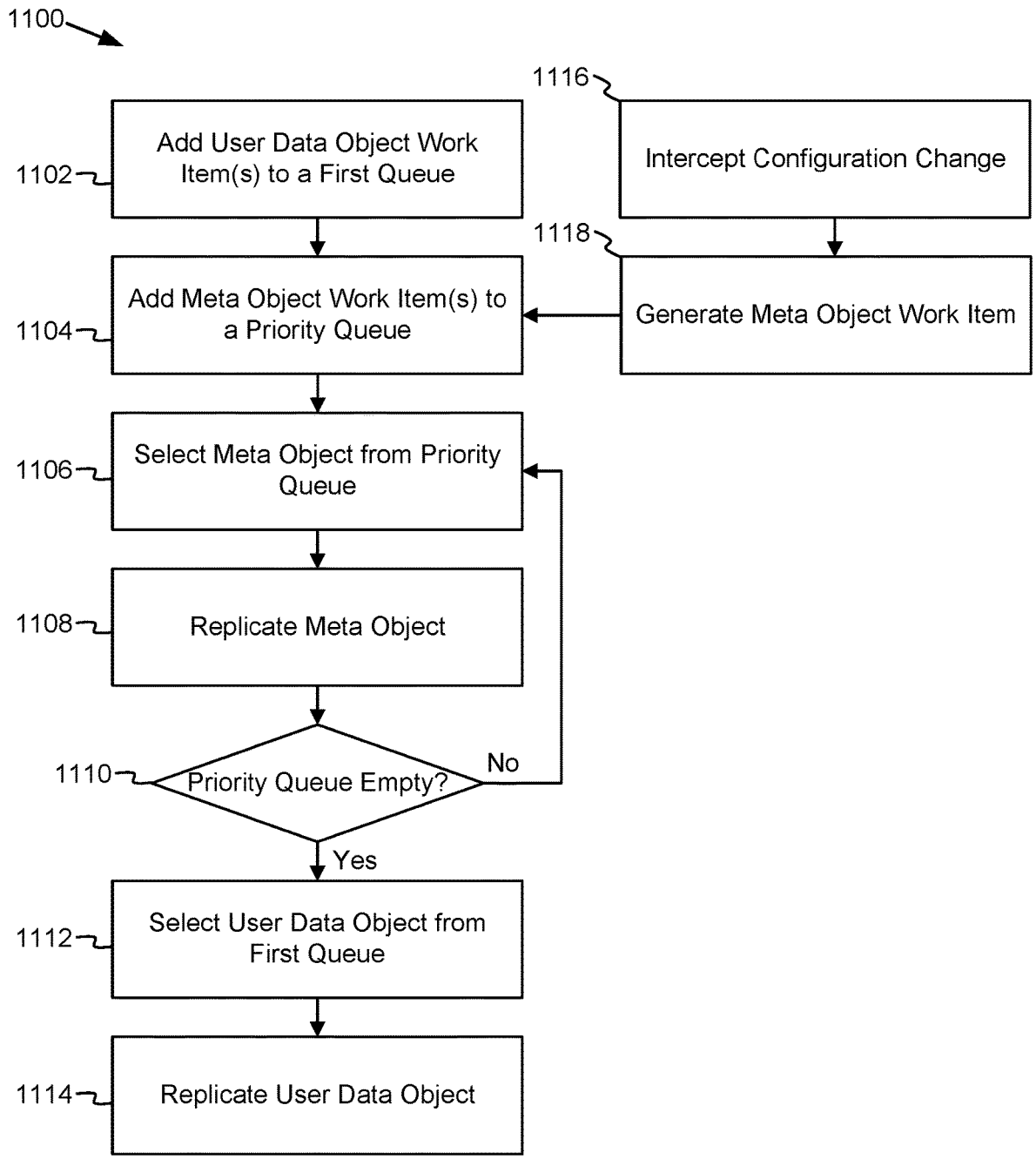
FIG. 11 illustrates an example method of replicating data objects with a priority queue.

As shown in FIG. 11, the object storage system 500 may be operated according to an example method of replicating meta objects, i.e. according to the method 1100 illustrated by the blocks 1102-1118 of FIG. 11.

At block 1102, user data object work items may be added to a first replication queue. For example, as user data requests are processed and user data objects are created and modified, the new or changed data objects may be queued for replication based on corresponding work items.

At block 1104, a meta object work item may be added to a priority queue. For example, the object storage system may maintain multiple work queues, including at least one for priority items that should be executed prior to regular work items, and meta object work items may be allocated to the priority queue.

At block 1106, a meta object may be selected for replication based on the priority queue. For example, meta object work items may be arranged in the priority queue according to a first in first out order and a next work item may be selected based on the meta object work item at the top of the priority queue.

At block 1108, the meta object may be replicated from one object data store to another object data store. For example, responsive to selecting the meta object work item from the priority queue, the next available replication engine may replicate the meta object by reading it from the original object store and putting it to a remote object store. In some embodiments, a dedicated replication engine may be assigned to process only work tasks from the priority queue.

At block 1110, whether the priority queue is empty or contains additional work items may be evaluated. If no, the priority queue is not empty, and method 1100 may return to block 1106 to select a next meta object from the priority queue. If yes, the priority queue is empty, and method 1100 may continue to block 1112.

At block 1112, a user data object may be selected from the first queue, which is not the priority queue. For example, if the priority queue is determined to be empty, user object work items may be selected from the normal queue according to whatever order or selection criteria the system uses for user data objects.

At block 1114, the user data object may be replicated from one object data store to another object data store. For example, responsive to selecting the user data object work item from the normal work item queue, the next available replication engine may replicate the user data object by reading it from the original object store and putting to a remote object store.

At block 1116, an object storage system may be configured to intercept configuration changes in real-time. For example, configuration change events may be detected based on client requests received by the system and/or changes to configuration metadata in a metadata store. In some embodiments, client changes to configuration parameters may be received via a specified syntax, such as bucket replication configuration changes requested via "put-bucket-replication". An example configuration may include:

```
{
    "Role": "arn:aws:iam::123456789012:role/s3-replication-role",
    "Rules": [
        {
            "Prefix": "",
            "Status": "Enabled",
            "Destination": {
                "Bucket": "arn:aws:s3:::destination",
                "StorageClass": "STANDARD"
            }
        }
    ]
}
```

At block 1118, a meta object work item may be generated. For example, the intercepted configuration change may be used to generate a work item for replicating a corresponding change to the meta object storing that configuration information. An example work item may include:
  {sourceBucketName, <source bucket name>,
  destinationBucketName=<destination bucket name>,
  sourceBucketConfig=<source bucket name>-config,
  sampleConfiguration=<source bucket configuration>}

Figure 12:
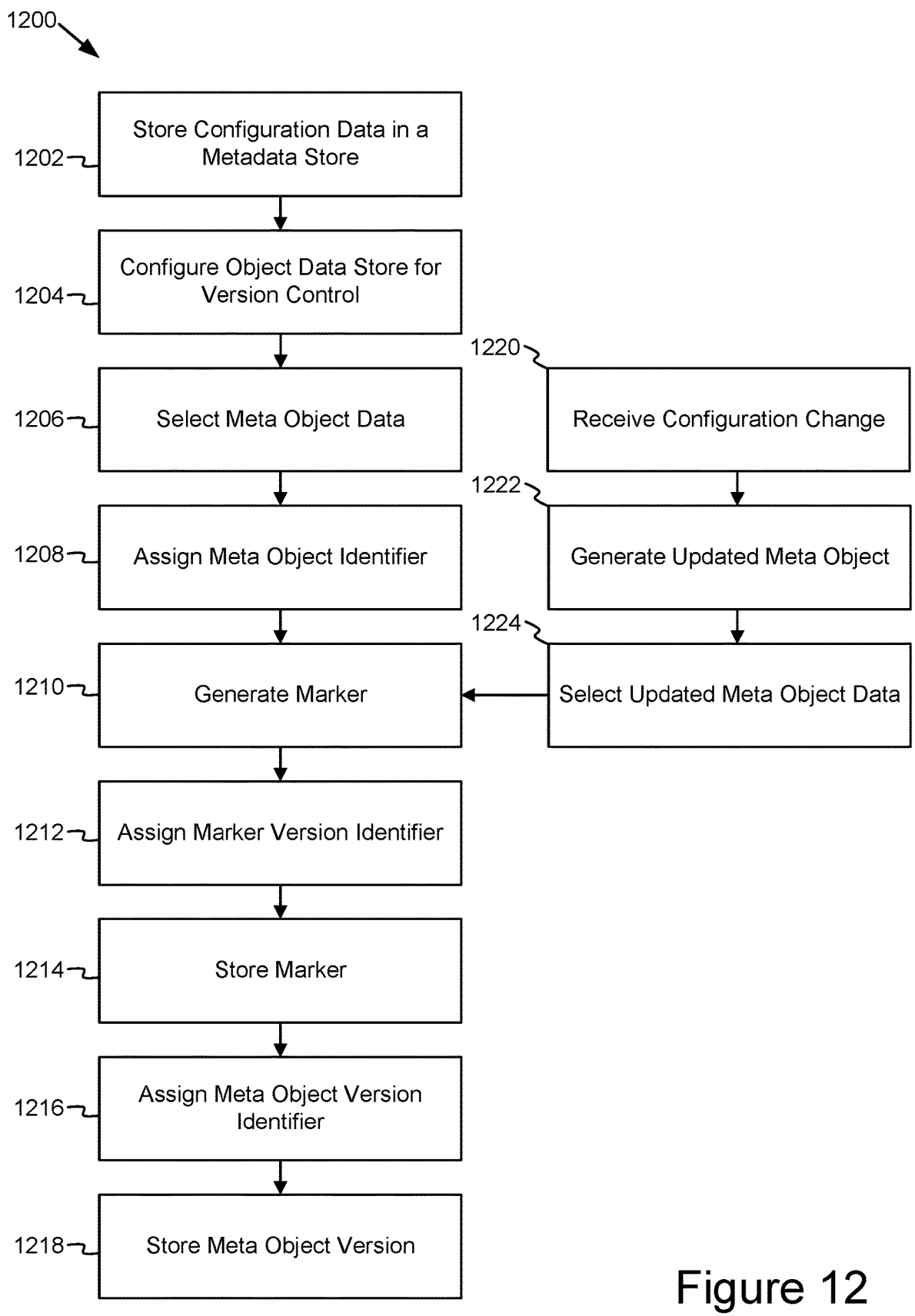
FIG. 12 illustrates an example method of storing meta objects using versions and markers.

As shown in FIG. 12, the object storage system 500 may be operated according to an example method of storing meta objects using version control, i.e. according to the method 1200 illustrated by the blocks 1202-1224 of FIG. 12.

At block 1202, configuration data or other internal operational data may be stored in a metadata store. For example, when a bucket is configured, various bucket configuration parameters may be stored in a bucket configuration table or entry in the metadata store for the object data store that includes the bucket.

At block 1204, the object data store may be configured for version control. For example, the object data store, object data buckets, and/or individual data objects may have versioning enabled in their respective configuration parameters.

At block 1206, meta object data may be selected for a meta object. For example, after a bucket is configured, its configuration parameters may be selected for storage and replication as a meta object.

At block 1208, a meta object identifier may be assigned to the meta object data for the meta object. For example, a GUID may be generated and a meta tag or other designation of meta object status may be added for the meta object identifier.

At block 1210, a marker may be generated that renders the meta object inaccessible to normal object access commands. For example, a crafted delete marker may be generated that is compatible with version handling by the object storage system and identifies all version of the meta object as not being part of the active user data object set.

At block 1212, a marker version identifier may be assigned to the generated marker. For example, a special algorithm for generating the version identifier may be used such that the marker maintains the most recent position in version order, even over a subsequently written version of the meta object.

At block 1214, the marker is stored to the object store as a version of the meta object. For example, the marker may be stored using the meta object identifier and the marker version identifier.

At block 1216, a meta object version identifier may be assigned to the meta object version containing the selected meta object data. For example, the meta object version identifier may be generated using a standard version identifier based on timestamp. This timestamp may be after the timestamp of generating the marker at block 1210 but result in a meta object version identifier that is before the marker version identifier in version order.

At block 1218, the meta object version may be stored to the object store as a version of the meta object. For example, the meta object version may include the selected meta object data and be stored using the meta object identifier and the meta object version identifier from block 1216.

At block 1220, a configuration change may be received for the configuration data stored in the meta object. For example, a command to change the bucket configuration may be received by a client request handler and intercepted by the meta object generator.

At block 1222, an updated meta object version may be generated based on the received configuration change. For example, the corresponding meta object identifier of the prior versions of that set of configuration parameters may be identified, such as the meta object identifier assigned at block 1208.

At block 1224, updated meta object data may be selected. For example, meta object data corresponding to the set of configuration parameters effected by the configuration change and corresponding to the meta object identifier may be selected as meta object data for the new version with updated configuration data. Method 1200 may return to block 1210 and proceed with generating a new or updated marker and subsequent blocks 1212-1218 to store the updated meta object version based on the updated meta object data.

Figure 13:
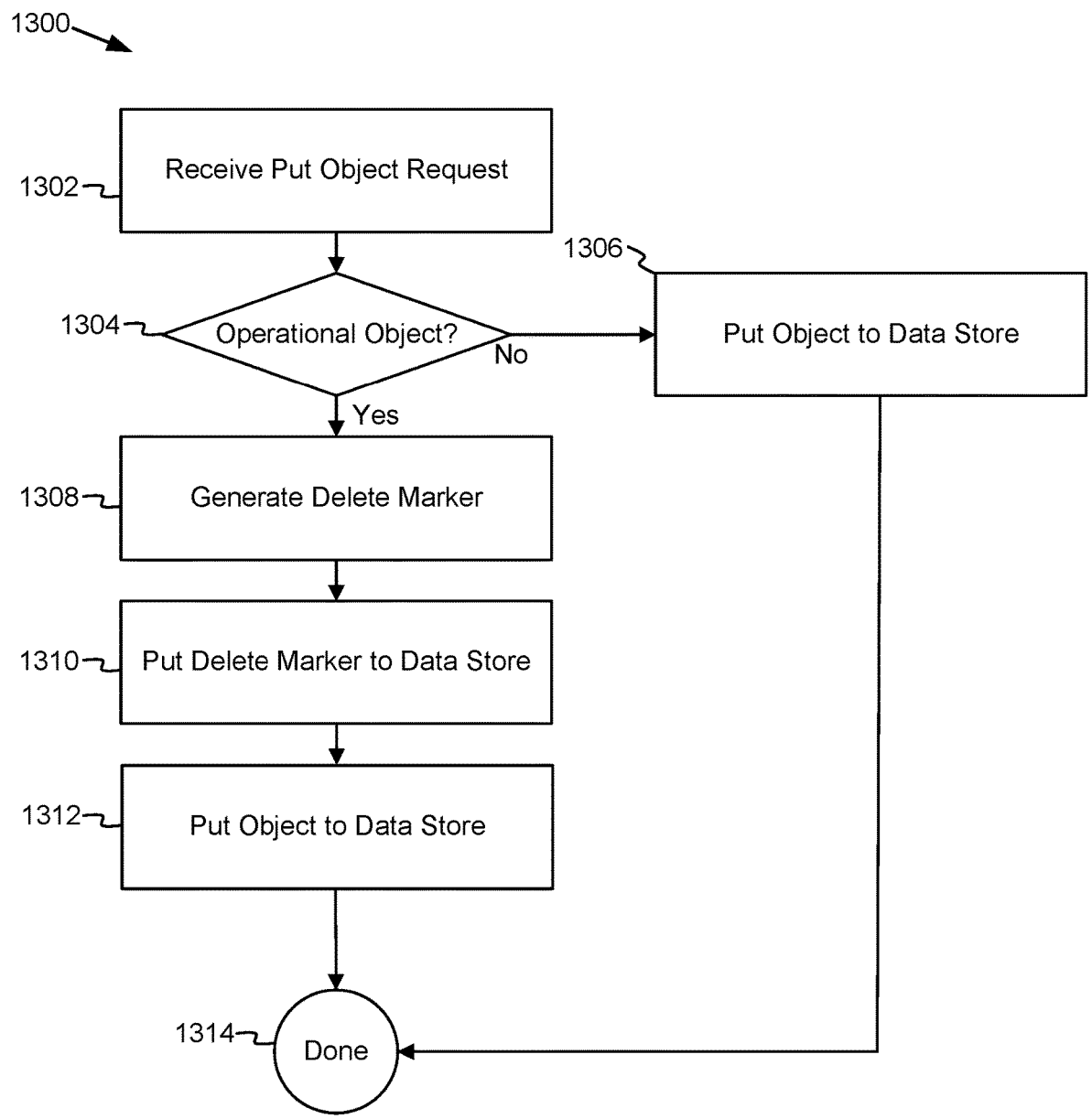
FIG. 13 illustrates an example method of using delete markers for storing meta objects.

As shown in FIG. 13, the object storage system 500 may be operated according to an example method of processing a PUT request to store meta objects using delete markers, i.e. according to the method 1300 illustrated by the blocks 1302-1314 of FIG. 13.

At block 1302, a put object request may be received. For example, a client request or an internally generated PUT command may be received by a storage manager or similar component.

At block 1304, the target data object may be evaluated for whether it is an operational object. For example, an operational object may be a data object that contains object data and/or metadata tags that include operational parameters and do not include user data, such as meta objects containing configuration data. If yes, method 1300 may proceed to block 1308. If no, method 1300 may proceed to block 1306.

At block 1306, the target data object has been determined not to be an operational object and may be a user data object. The put object request may be handled according to user data object processing to put the target data object to the destination data store. The operation may be complete at block 1314.

At block 1308, a delete marker corresponding to the target object may be generated. For example, a crafted delete marker using the object identifier for the operational data object may be generated and include a timestamp algorithm configured to place the crafted delete marker later in time than the subsequent target object put.

At block 1310, the delete marker is put to the destination data store. For example, the delete marker with the delayed timestamp may be put using a special PUT command.

At block 1312, the target data object may be put to the destination data store. For example, a PUT target data object command may be processed to write the operational object to the destination data store. Despite the later timestamp of the actual operation, the delete marker may appear to the system to be created after the put of the operational object such that the delete marker renders the operational object not part of the active user data object set. The operation may be complete at block 1314.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
    a first object data store configured to:
        store a plurality of data objects, wherein each data object includes object data stored in a storage medium of the first object data store; and
        associate, in a first metadata store, a storage location for the object data for each data object with an object identifier and object metadata for that data object;
    the first metadata store configured to:
        store the object identifiers and object metadata for accessing data objects stored in the first object data store; and
        store configuration data for the first object data store, wherein the configuration data includes configuration parameters for rebuilding the configuration data in a recovery metadata store;
    a meta object generator configured to:
        generate a first version of a meta object, wherein the first version of the meta object includes:
            meta object data selected from the configuration parameters;
            a meta object identifier assigned to the meta object; and
            a first version identifier associated with the first version of the meta object data;
        generate a second version of the meta object, wherein the second version of the meta object includes:
            the meta object identifier assigned to the meta object; and
            a second version identifier associated with a marker for the meta object, wherein the marker prevents exposure of the meta object as a user data object;
        store each version of the meta object as a data object in the first object data store with the plurality of data objects; and
        associate, in the first metadata store, at least one storage location for the meta object data with the meta object identifier and object metadata for each version of the meta object; and
    a storage interface configured to:
        read the configuration data from the first metadata store to define a storage protocol for processing object data requests for the plurality of data objects stored in the first object data store; and read rebuilt configuration data from the recovery metadata store, wherein the rebuilt configuration data is based on the configuration parameters from the first version of the meta object.

2. The system of claim 1, wherein:
the meta object generator is further configured to:
generate the second version of the meta object prior to generating the first version of the meta object; and
generate a greater version value for the second version identifier of the meta object than a first version value for the first version identifier of the meta object; and
the storage interface is further configured to determine a current version of the meta object based on a greatest version value.

3. The system of claim 2, wherein:
the first object data store is further configured to store the plurality of data objects in a data object bucket;
the meta object data includes bucket configuration parameters for the data object bucket; and
the meta object and user data objects are stored in the data object bucket.

4. The system of claim 1, further comprising:
a replication manager configured to replicate the meta object and user data objects from the first object data store to a second object data store.

5. The system of claim 1, wherein the meta object generator is further configured to use a version control function to determine the first version identifier and the second version identifier.

6. The system of claim 5, wherein the version control function for the second version identifier is configured to increase a timestamp value for the marker to determine the second version identifier.

7. The system of claim 1, wherein the marker is a delete marker.

8. The system of claim 1, wherein the meta object generator is further configured to:
receive a configuration change for updated configuration data for the first object data store;
generate an updated meta object, wherein the updated meta object includes:
updated meta object data based on the updated configuration data;
the meta object identifier assigned to the meta object;
a third version identifier associated with the updated meta object data; and
a fourth version identifier associated with an updated marker for the meta object, wherein the updated marker prevents exposure as a user data object; and
store the updated meta object in the first object data store.

9. The system of claim 1, wherein:
the storage interface is further configured to:
receive a user data request including the meta object identifier; and
return, responsive to the marker, an error message.

10. A computer-implemented method, comprising:
storing, in a first object data store, a plurality of data objects, wherein each data object includes object data stored in a storage medium of the first object data store;
storing, in a first metadata store, a storage location for the object data for each data object with an object identifier and object metadata for that data object;
storing, in the first metadata store, configuration data for the first object data store, wherein the configuration data-includes configuration parameters for rebuilding the configuration data in a recovery metadata store;
selecting meta object data for a meta object from the configuration parameters;
assigning a meta object identifier to the meta object;
generating a first version of the meta object including the meta object data;
assigning a first version identifier to the first version of the meta object data;
generating a second version of the meta object;
assigning, to the second version of the meta object, a second version identifier associated with a marker for the meta object, wherein the marker prevents exposure of the meta object as a user data object;
storing each version of the meta object as a data object in the first object data store;
associating, in the first metadata store, at least one storage location for the meta object data with the meta object identifier and object metadata for each version of the meta object;
reading the configuration data from the first metadata store to define a storage protocol for processing object data requests for the plurality of data objects stored in the first object data store; and
reading rebuilt configuration data from the recovery metadata store, wherein the rebuilt configuration data is based on the configuration parameters from the first version of the meta object.

11. The computer-implemented method of claim 10, further comprising:
generating the second version of the meta object prior to generating the first version of the meta object;
generating, for the second version identifier of the meta object, a greater version value than a first version value for the first version identifier of the meta object; and
determining a current version of the meta object based on a greatest version value.

12. The computer-implemented method of claim 11, further comprising:
configuring the first object data store to store the plurality of data objects in a data object bucket, wherein:
the meta object data includes bucket configuration parameters for the data object bucket; and
the meta object and user data objects are stored in the data object bucket.

13. The computer-implemented method of claim 10, further comprising:
replicating the meta object and the user data objects from the first object data store to a second object data store.

14. The computer-implemented method of claim 10, wherein:
assigning the first version identifier uses a version control function; and
assigning the second version identifier uses the version control function.

15. The computer-implemented method of claim 14, wherein assigning the second version identifier includes increasing a timestamp value for the marker to determine the second version identifier.

16. The computer-implemented method of claim 10, wherein the marker is a delete marker.

17. The computer-implemented method of claim 10, further comprising
receiving a configuration change for updated configuration data for the first object data store;
generating an updated meta object, wherein the updated meta object includes:
updated meta object data based on the updated configuration data;

the meta object identifier assigned to the meta object;
a third version identifier associated with the updated meta object data; and
a fourth version identifier associated with an updated marker for the meta object, wherein the marker prevents exposure as a user data object; and
storing the updated meta object in the first object data store.

18. The computer-implemented method of claim 10, further comprising:
receiving a user data request including the meta object identifier; and
returning, responsive to the marker, an error message.

19. A system, comprising:
a first object data store configured to:
store data objects, wherein each data object includes object data stored in a storage medium of the first object data store; and
associate, in a first metadata store, a storage location for the object data for each data object with an object identifier and object metadata for that data object;
the first metadata store configured to:
store the object identifiers and object metadata for accessing the data objects stored in the first object data store; and
store configuration data for the first object data store, wherein the configuration data includes configuration parameters for rebuilding the configuration data in a recovery metadata store;
means for selecting meta object data for a meta object from the configuration parameters;
means for assigning a meta object identifier to the meta object;
means for generating a first version of the meta object including the meta object data;
means for assigning a first version identifier to the first version of the meta object data;
means for generating a second version of the meta object;
means for assigning, to the second version of the meta object, a second version identifier associated with a marker for the meta object, wherein the marker prevents exposure of the meta object as a user data object;
means for storing each version of the meta object as a data object in the first object data store with the data objects;
means for associating, in the first metadata store, at least one storage location for the meta object data with the meta object identifier and object metadata for each version of the meta object;
means for reading the configuration data from the first metadata store to define a storage protocol for processing object data requests for the data objects stored in the first object data store; and
means for reading rebuilt configuration data from the recovery metadata store, wherein the rebuilt configuration data is based on the configuration parameters from the first version of the meta object.

20. The system of claim 19, further comprising:
means for receiving a configuration change for updated configuration data for the first object data store;
means for generating an updated meta object, wherein the updated meta object includes:
updated meta object data based on the updated configuration data;
the meta object identifier assigned to the meta object;
a third version identifier associated with the updated meta object data; and
a fourth version identifier associated with an updated marker for the meta object, wherein the marker prevents exposure as a user data object; and
means for storing the updated meta object in the first object data store.

* * * * *